United States Patent
Takamizawa et al.

[15] 3,679,677
[45] July 25, 1972

[54] 1,3-DITHIOL COMPOUNDS

[72] Inventors: Akira Takamizawa, Ibaraki; Kentaro Hirai, Kyoto, both of Japan

[73] Assignee: Shionogi & Co., Ltd., Higashi-ku, Osaka, Japan

[22] Filed: Feb. 11, 1970

[21] Appl. No.: 10,620

[30] Foreign Application Priority Data

Feb. 14, 1969 Japan..................................44/11165

[52] U.S. Cl...................260/247.1, 260/268 H, 260/293.68,
260/327 M, 424/248, 424/267, 424/277
[51] Int. Cl..................A61k 27/00, C07d 87/46, C07d 71/00
[58] Field of Search......................260/327 M, 247.1, 293.68

[56] References Cited

OTHER PUBLICATIONS

Campaigne et al., J.O.C. 29: 2877–2881 (October, 1964).

*Primary Examiner*—Henry R. Jiles
*Assistant Examiner*—Cecilia M. Shurko
*Attorney*—Wenderoth, Lind and Ponack

[57] ABSTRACT

A 1,3-dithiol compound represented by the formula:

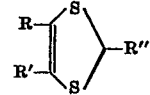

wherein R and R' represent each hydrogen, lower alkyl, aryl or ar(lower)alkyl and R" represents hydroxy, lower alkoxy, (lower)alkylthio, aryloxy, arylthio, ar(lower)alkoxy, ar(lower)alkylthio or (mono- or di-substituted)aminothiocarbonylthio, being useful as antibacterial, antifungal, anti-inflammatory, insecticidal, miticidal agents or their intermediates, is prepared from a 1,3-di-thiol-2-yliden-ammonium salt in 3 steps.

21 Claims, No Drawings

1,3-DITHIOL COMPOUNDS

The present invention relates to 1,3-dithiol compounds. In particular, this invention relates to 1,3-dithiol compounds represented by the formula:

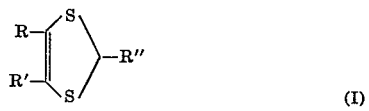

wherein R and R' represent each hydrogen, lower alkyl, aryl or ar(lower)alkyl and R'' represents hydroxy, lower alkoxy, (lower)-alkylthio aryloxy, arylthio, ar(lower)alkoxy, ar(lower)alkylthio or (mono- or di-substituted)aminodithiocarbonylthio which are useful as antibacterial, antifungal, anti-inflammatory, insecticidal, miticidal agents or their intermediates. The present invention also relates to the production of the said compounds (I).

Accordingly, a basic object of the present invention is to embody novel 1,3-dithiol compounds (I). Another object of the invention is to embody 1,3-dithiol compounds (I) useful as antibacterial, antifungal, anti-inflammatory, insecticidal, miticidal agents or their intermediates. A further object of this invention is to embody a process for the production of the 1,3-dithiol compounds (I). These and other objects will be apparent to those conversant with the appurtenant art from the following description of the general class of compounds and the several specific examples and methods of obtaining them presented.

According to the present invention, the said 1,3-dithiol compounds (I) can be prepared from a 1,3-dithiol-2-yliden-ammonium salt in 3 steps, as shown in the following schema:

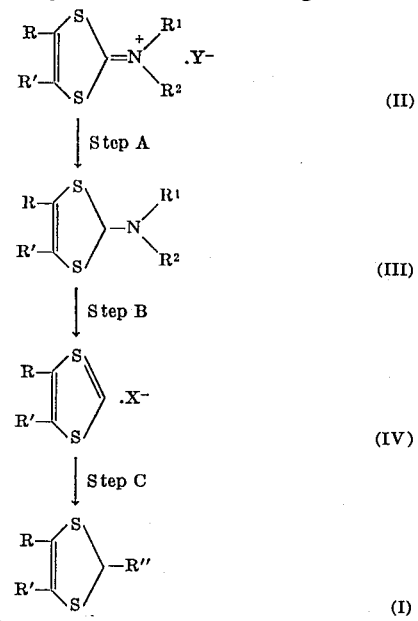

wherein R and R' represent each hydrogen, lower alkyl (e.g. n-butyl, isopropyl, methyl, ethyl), aryl (e.g. phenyl, 2-naphthyl, p-chloro-phenyl, p-tolyl, p-methoxyphenyl), or ar(lower)alkyl (e.g. benzyl, phenethyl, p-methoxyphenyl-n-propyl), $R^1$ and $R^2$ represent each lower alkyl (e.g. ethyl, isobutyl, methyl, n-pentyl), aryl (e.g. phenyl, 1-naphthyl, p-tolyl, o-methoxyphenyl), ar(lower)alkyl (e.g. phenethyl, benzyl, m-chlorophenyl-n-butyl) or heterocyclic ring in combination with inclusion of the nitrogen atom (e.g. morpholino, piperidino or piperazino), $X^-$ and $Y^-$ represent each an anion of a strong acid (e.g. hydrochloric acid, sulfuric acid, nitric acid, perchloric acid, fluoboric acid, hydrobromic acid, hydroiodic acid, phosphoric acid, rhodanic acid, p-toluenesulfonic acid, picric acid, nitrobenzoic acid, halogenoacetic acid) and R'' represents hydroxy, lower alkoxy (e.g. isopropoxy, ethoxy, methoxy, n-pentyl-oxy), (lower)alkylthio (e.g. ethylthio, n-pentylthio, methylthio, isobutylthio), aryloxy (e.g. 2-naphthyloxy, 1-naphthyloxy, phenoxy, p-tolyloxy, o-chlorophenoxy, p-nitrophenoxy), arylthio (e.g. p-tolylthio, 2-naphthylthio, phenylthio, p-chlorophenylthio), ar(lower)-aloxy (e.g. benzyloxy, phenethyloxy, 2-naphthyl-n-propyloxy, p-methoxy-phenethyloxy), ar(lower)alkylthio (e.g. benzylthio, phenethylthio, p-chlorobenzylthio, 1-naphthyl-n-propylthio) or (mono-or di-substituted)aminothiocarbonylthio (e.g. morpholinothiocarbonylthio, piperidinothiocarbonylthio; methylphenylaminocarbonylthio, dimethylaminothiocarbonylthio, ethylaminothiocarbonylthio, diethylaminothiocarbonylthio). The Steps A, B and C are explained more concretely as follows:

STEP A

Step A is effected by reducing the 1,3-dithiol-ammonium salt (II) with a metallic hydride complex (e.g. lithium aluminum hydride, sodium borohydride, lithium borohydride) in an inert solvent (e.g. water, methanol, ethanol, tetrahydrofuran, dioxane, ether, pyridine) in the range of temperature from ice cooling below room temperature to the boiling point of the solvent. The starting 1,3-dithiol-ammonium salt (II) involves illustratively;

N-(4-phenyl-1,3-dithiol-2-yliden)-piperidinium hydrogen sulfate,

N-(4-phenyl-1,3-dithiol-2-yliden)-morpholinium fluoborate,

N-(4-phenyl-1,3-dithiol-2-yliden)-morpholinium hydrogen sulfate,

N-(4-phenyl-1,3-dithiol-2-yliden)-N-methylbenzylammonium fluoborate,

N-(4-phenyl-1,3-dithiol-2-yliden)-N-dimethylammonium perchlorate,

N-[4-(p-nitrophenyl)-1,3dithiol-2-yliden]-piperidinium fluo-borate,

N-[4-(p-nitrophenyl)-1,3-dithiol-2-yliden]-piperidinium hydrogen sulfate,

N-[4-(p-bromophenyl)-1,3-dithiol-2-yliden]-piperidinium fluoborate,

N-[4-(p-tolyl)-1,3-dithiol-2-yliden]-piperidinium hydrogen sulfate, and

N-[4-(p-methoxyphenyl)-1,3-dithiol-2-yliden]-piperidinium hydrogen sulfate.

Thus, there is obtained the 2-(di-substituted)amino-1,3-dithiol (III) successfully.

STEP B

Step B is effected by reacting the 2-(di-substituted)amino-1,3-dithiol (III) obtained in Step A with a strong acid (e.g. hydrochloric acid, hydrobromic acid, hydroiodic acid, phosphoric acid, rhodanic acid, p-toluenesulfonic acid, picric acid, p-nitrobenzoic acid, monochloroacetic acid, trifluoroacetic acid) in an inert solvent. The starting 2-(di-substituted)amino-1,3-dithiol (III) involves illustratively;

2-piperidino-4-phenyl-1,3-dithiol,
2-morpholino-4-phenyl-1,3-dithiol,
2-methylbenzylamino-4-phenyl-1,3-dithiol,
2-dimethylamino-4-phenyl-1,3-dithiol,
2-piperidino-4-(p-nitrophenyl)-1,3-dithiol,
2-piperidino-4-(p-bromophenyl)-1,3-dithiol,
2-piperidino-4-(p-tolyl)-1,3-dithiol, and
2-piperidino-4-(p-methoxyphenyl)-1,3-dithiol.

The present reaction may be effected favorably in the range of temperature from room temperature to the boiling point of the solvent. Examples of the solvent are water, methanol, ethanol, monoglyme, diglyme, ether, dioxane, tetrahydrofuran and pyridine, and a suitable solvent may be selected according to sorts of the starting compound (III) and the strong acid. Thus, there is obtained the 1,3-dithiolium salt )IV) in a good yield.

STEP C

Step C is effected by reacting the 2,3-dithiolium salt (IV) obtained in Step B with a nucleophilic reagent. The starting 1,3-dithiolium salt (IV) involves illustratively;

4-phenyl-1,3-dithiolium perchlorate, 4-phenyl-1,3-dithiolium hydrogen sulfate,
4-(p-nitrophenyl)-1,3-dithiolium perchlorate,
4-(p-bromophenyl)-1,3dithiolium perchlorate,
4-(p-bromophenyl)-1,3-dithiolium hydrogen sulfate,
4-(p-tolyl)-1,3-dithiolium perchlorate,
4-(p-tolyl)-1,3-dithiolium hydrogen sulfate,
4-(p-methoxyphenyl)-1,3-dithiolium perchlorate,
4,5-diphenyl-1,3-dithiolium picrate,
4-(p-chlorophenyl)-1,3-dithiolium fluoborate, and
4-(p-hydroxyphenyl)-1,3-dithiolium hydrogen sulfate.

Examples of the nucleophilic reagents are water, alcohols (e.g. ethanol, methanol, isopropanol, n-pentanol, isobutanol, benzyl alcohol, phenethyl alcohol, 2-naphthyl-n-propyl alcohol, p-methoxyphenethyl alcohol), alkali alcoxide (e.g. sodium n-propoxide, potassium methoxide, sodium ethoxide, lithium n-pentyloxide, potassium isopropoxide, potassium benzyloxide, sodium phenethoxide, sodium 2-naphthyl-n-propoxide), mercaptan (e.g. ethyl mercaptan, isobutyl mercaptan, methyl mercaptan, isopentyl mercaptan, benzyl mercaptan, phenethyl mercaptan, p-chlorobenzyl mercaptan, 1-naphthyl-n-propyl mercaptan), alkali mercaptide (e.g. ethyl sodium mercaptide, isobutyl potassium mercaptide, phenethyl lithium mercaptide, p-methoxyphe-nethyl potassium mercaptide), alkali phenolates (e.g. sodium phenolate, potassium p-nitrophenolate, sodium 2-naphtholate, lithium p-methoxyphenolate), alkali thiophenolates (e.g. sodium thiophenolate, potassium p-chlorothiophenolate, lithium thio-1-naphtholate, sodium p-nitrothiophenolate) and alkali (mono- or di-substituted)-aminodithiocarbamate (e.g. sodium dimethylaminodithiocarbamate, potassium methylphenylaminodithiocarbamate, sodium piperidinodithiocarbamate, potassium morpholinodithiocarbamate, sodium diisopropylaminodithiocarbamate, potassium diphenylaminodithiocarbamate, sodium dibenzylaminodithiocarbamate, potassium methylbenzylaminodithiocarbamate), the said alkali salts being possibly substituted for alkali earth salts (e.g. calcium or barium salts), ammonium salts or salts of an organic base (e.g. morpholine, piperidine, methylbenzylamine, pyrrolidine). The reaction of this step may be favorably effected in the range of temperature from room temperature to the boiling point of the solvent used, when needed, in the presence of a base (e.g. sodium hydroxide, potassium carbonate, sodium bicarbonate, pyridine, triethylamine, dimethylaniline). Examples of the solvent are alcohols (e.g. methanol, ethanol, isopropanol), ethers (e.g. tetrahydrofuran, diglyme, monoglyme, ether, dioxane), acetone, chloroform and hydrocarbons (e.g. benzene, toluene), and an excess of the nucleophilic reagent may be used in lieu of the solvent.

The thus-obtained 1,3-dithiol compounds (I) involve illustratively;

2-methoxy-4-phenyl-1,3-dithiol,
2-methoxy-(p-tolyl)-1,3-dithiol,
2-methoxy-4-(p-bromophenyl)-1,3-dithiol,
2-methoxy-4-(p-chlorophenyl)-1,3-dithiol,
2-methoxy-4-(p-nitrophenyl)-1,3-dithiol,
2-methoxy-4,5-diphenyl-1,3-dithiol,
2-ethoxy-4,5-diphenyl-1,3-dithiol,
2-phenylthio-4-phenyl-1,3-dithiol,
2-hydroxy-4-phenyl-1,3-dithiol,
2-morpholinothiocarbonylthio-4-phenyl-1,3-dithiol,
2-piperidinothiocarbonylthio-4-phenyl-1,3-dithiol,
2-dimethylaminothiocarbonylthio-4-phenyl-1,3-dithiol,
2-dimethylaminothiocarbonylthio-4-(p-chlorophenyl)-1,3-dithiol,
2-dimethylaminothiocarbonylthio-4-(p-hydroxyphenyl)-1,3-dithiol,
2-dimethylaminothiocarbonylthio-4-(p-methoxyphenyl)-1,3-dithiol,
2-dimethylaminothiocarbonylthio-4-(p-tolyl)-1,3-dithiol,
2-(2-naphthyl)thio-4-phenyl-1,3-dithiol,
2-(2-naphthoxy)-4-phenyl-1,3-dithiol,
2-(p-tolylthio)-4-phenyl-1,3-dithiol, and
2-dimethylaminothiocarbonylthio-4-(p-nitrophenyl)-1,3-dithiol.

These 1,3-dithiol compounds (I) are useful as antibacterial, antifungal, anti-inflammatory, insecticidal, miticidal agents or their intermediates, and so they can be used broadly in the field of medicinals, animal's drugs or agricultural chemicals. For instance, 2-phenylthio-4-phenyl-1,3-dithiol and 2-dimethylaminothiocarbonylthio-4-phenyl-1,3-dithiol showed about 5 to 10 mcg/ml of the minimum inhibitory concentrations in the agar dilution method against Trichophyton rubrum, Trichophyton ferrugineum, Trichophyton purpureum, Trichophyton mentagrophytes and Epidermophyton fluccosum. Still, 2-dimethylaminothiocarbonylthio-4-phenyl-1,3-dithiol showed 10 mcg/ml of the minimum inhibitory concentration in the tube dilution method against Mycobacterium tuberculosis H37 Rv and was about 1.5 times more potent in the preventive activity against Piricularia oryzae in comparison with PCBA (i.e. pentachlorobenzyl alcohol). Further, 2-methoxy-4-phenyl-1,3-dithiol showed powerful insecticidal activity against Musca domestica and miticidal activity against Tetranychus telarius.

Presently-preferred and practical embodiments of the present invention are illustratively shown in the following examples. Temperatures are set forth in degrees centigrade.

EXAMPLE 1.

a. To a suspension of N-(4-phenyl-1,3-dithiol-2-yliden)-piperidinium fluoborate (1.0 g) in ethanol (10 ml), there is added sodium borohydride (0.3 g), and the resultant mixture is stirred at room temperature for 2 hours. The reaction mixture is combined with a small amount of acetone and concentrated under reduced pressure. The residue is crystallized from water to give colorless needles. The needles are collected by filtration and dried to give 2-piperidino-4-phenyl-1,3-dithiol (0.7 g) as crystals melting at 87° to 88° C. The yield is 95 percent.

b. To a suspension of 2-piperidino-4-phenyl-1,3-dithiol (0.5 g) in ethanol (30 ml), there is added dropwise 70 percent perchloric acid. The precipitated light pink crystals are collected by filt-ration and dried to give 4-phenyl-1,3-dithiolium perchlorate (0.5 g) as crystals melting at 179° to 180° C. (decomp.). The yield is 95 %.

c. To a hot solution of 4-phenyl-1,3-dithiolium perchlorate (3.0 g) in methanol (80 ml), there is added 10 percent aqueous solution (30 ml) of sodium carbonate, and the resultant mixture is concentrated under reduced pressure. The residue is combined with water, and the precipitated crystals are collected by filtration and recrystallized from dilute ethanol to give 2-methoxy-4-phenyl-1,3-dithiol (2.2 g) as colorless needles melting at 61° C. The yield is 97 percent. Similarly, there are obtained the following compounds.

1. 2-Methoxy-4-(p-methoxyphenyl)-1,3-dithiol, m.p. 50°–52 C.
2. 2-Methoxy-4-(p-tolyl)-1,3-dithiol, oil.
3. 2-Methoxy-4-(p-bromophenyl)-1,3-dithiol, m.p. 43°–44° C.
4. 2-Methoxy-4-(p-chlorophenyl)-1,3-dithiol, m.p. 32°–34° C.
5. 2-Methoxy-4-(p-nitrophenyl)-1,3-dithiol, m.p. 116°–117° C.
6. 2-Methoxy-4,5-diphenyl-1,3-dithiol, m.p. 67°–68° C.
7. 2-Ethoxy-4,5-diphenyl-1,3-dithiol, m.p. 78°–80° C.

EXAMPLE 2.

a. N-(4-Phenyl-1,3-dithiol-2-yliden)-morpholinium fluoborate is treated with sodium borohydride in ethanol to give 2-morpholino-4-phenyl-1,3-dithiol as crystals melting at 82°–83 C. The yield is 93 percent.

b. 2-Morpholino-4-phenyl-1,3-dithiol is reacted with conc. sulfuric acid to give 4-phenyl-1,3-dithiolium hydrogen sulfate as crystals melting at 180° C. The yield is 94 percent.

c. To a sodium thiophenolate solution prepared by adding thiophenol (100 mg) to a solution of metallic sodium (22 mg) in anhydrous ether (8 ml), there is added 4-phenyl-1,3-dithiolium hydrogen sulfate (200 mg), and the resultant mixture is refluxed for an hour. The reaction mixture is concentrated to remove the solvent, and the residue is crystallized from petroleum benzene to give 2-phenylthio-4-phenyl-1,3-dithiol (134 mg) as crystals melting at 81° to 82° C. The yield is 66 percent. Similarly, there are obtained the following compounds.

1. 2-(p-Tolylthio)-4-phenyl-1,3-dithiol, m.p. 93°–94° C.
2. 2-(2-Naphthylthio)-4-phenyl-1,3-dithiol, m.p. 129°–130° C.
3. 2-(2-Naphthyloxy)-4-phenyl-1,3-dithiol, oil.

EXAMPLE 3.

To a suspension of 4-phenyl-1,3-dithiolium hydrogen sulfate (200 mg) in ether (30 ml), there is added water (10 ml), and the resultant mixture is shaken with ether. The ethereal layer is separated, dried and concentrated to remove the ether. Thus, there is obtained 2-hydroxy-4-phenyl-1,3-dithiol (100 mg) as light brown prisms melting at 90° to 92° C. The yield is 70 percent.

EXAMPLE 4.

To a suspension of 4-phenyl-1,3-dithiolium hydrogen sulfate (100 mg) in acetone (100 ml), there is added morpholine morpholinocarbodithioate (150 mg), and the resultant mixture is refluxed for 20 minutes. The reaction mixture is concentrated to remove the solvent, and the residue is combined with water. The mixture is shaken with ether. The ethereal layer is dried and the solvent is evaporated to give 2-morpholinothiocarbonylthio-4-phenyl-1,3-dithiol (130 mg) as crystals melting at 119° to 120° C. The yield is 96 percent. Similarly, there are obtained the following compounds.

1. 2-Piperidinothiocarbonylthio-4-phenyl-1,3-dithiol, m.p. 119°–120° C.
2. 2-Dimethylaminothiocarbonylthio-4-phenyl-1,3-dithiol, m.p. 78°–79° C.
3. 2-Dimethylaminothiocarbonylthio-4-(p-chlorophenyl)-1,3-dithiol, m.p. 107°–108° C.
4. 2-Dimethylaminothiocarbonylthio-4-(p-hydroxyphenyl)-1,3-dithiol, m.p. 114°–115° C.
5. 2-Dimethylaminothiocarbonylthio-4-(p-methoxyphenyl)-1,3-dithiol, m.p. 112°–114° C.
6. 2-Dimethylaminothiocarbonylthio-4-(p-tolyl)-1,3-dithiol, m.p. 96°–99° C.
7. 2-Dimethylaminothiocarbonylthio-4-(p-nitrophenyl)-1,3-dithiol, m.p. 134°–136° C.

What is claimed is:
1. A 1,3-dithiol compound represented by the formula:

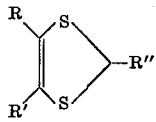

wherein R and R' represent each hydrogen, lower alkyl, phenyl, 2-naphthyl, p-chlorophenyl, p-tolyl p-methoxyphenyl benzyl, phenethyl, or p-methoxyphenyl-n-propyl and R" represents hydroxy, lower alkoxy, (lower)alkyl-thio, 2-naphthyloxy, 1-naphthyloxy, phenoxy, p-tolyloxy, o-chlorophenoxy, p-nitrophenox p-tolylthio, 2-naphthylthio, phenylthio, p-chlorophenylthio benzyloxy, phenylethyloxy, 2-naphthyl-n-propyloxy, p-methoxy-phenethyloxy, benzylthio, phenylethylthio, p-chlorobenzylthio, 1-naphthyl-n-propylthio morpholinothiocarbonylthio, piperidino-thiocarbonylthio, methylphenylaminothiocarbonylthio, dimethylamino-thiocarbonylthio, ethylaminothiocarbonylthio, or diethylamino-thiocarbonylthio.

2. A compound according to claim 1, in which R is phenyl, R' is hydrogen and R" is methoxy.
3. A compound according to claim 1, in which R is p-tolyl, R' is hydrogen and R" is methoxy.
4. A compound according to claim 1, in which R is p-bromophenyl, R' is hydrogen and R" is methoxy.
5. A compound according to claim 1, in which R is p-chlorophenyl, R' is hydrogen and R" is methoxy.
6. A compound according to claim 1, in which R is p-nitrophenyl, R' is hydrogen and R" is methoxy.
7. A compound according to claim 1, in which R and R' are each phenyl and R" is methoxy.
8. A compound according to claim 1, in which R and R' are each phenyl and R" is ethoxy.
9. A compound according to claim 1, in which R is phenyl, R' is hydrogen and R" is phenylthio.
10. A compound according to claim 1, in which R is phenyl, R' is hydrogen and R" is hydroxy.
11. A compound according to claim 1, in which R is phenyl, R' is hydrogen and R" is morpholinothiocarbonylthio.
12. A compound according to claim 1, in which R is phenyl, R' is hydrogen and R" is piperidinothiocarbonylthio.
13. A compound according to claim 1, in which R is phenyl, R' is hydrogen and R" is dimethylaminothiocarbonylthio.
14. A compound according to claim 1, in which R is p-chlorophenyl, R' is hydrogen and R" is dimethylaminothiocarbonylthio.
15. A compound according to claim 1, in which R is p-hydroxyphenyl, R' is hydrogen and R" is dimethylaminothiocarbonyl-thio.
16. A compound according to claim 1, in which R is p-methoxyphenyl, R' is hydrogen and R" is dimethylaminothiocarbonyl-thio.
17. A compound according to claim 1, in which R is p-tolyl, R' is hydrogen and R" is dimethylaminothiocarbonylthio.
18. A compound according to claim 1, in which R is phenyl, R' is hydrogen and R" is 2-naphthylthio.
19. A compound according to claim 1, in which R is phenyl, R' is hydrogen and R" is 2-naphthyloxy.
20. A compound according to claim 1, in which R is phenyl. R' is hydrogen and R" is p-tolylthio.
21. A compound according to claim 1, in which R is p-nitrophenyl, R' is hydrogen and R" is dimethylaminothiocarbonylthio.

* * * * *